May 4, 1965  D. A. MARRA, SR  3,181,588
SCARFING TORCH TIP
Filed April 16, 1962
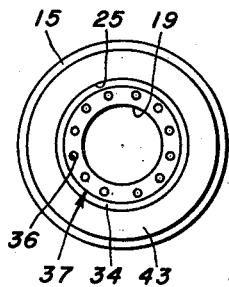
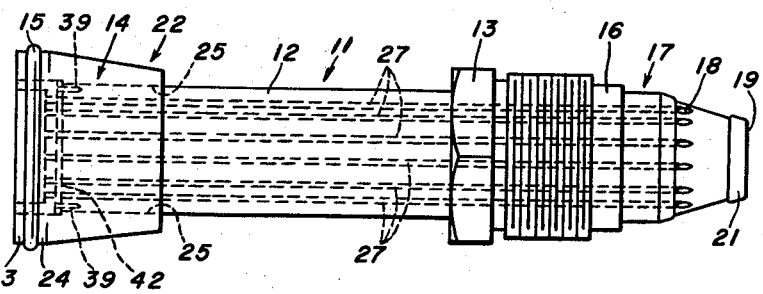
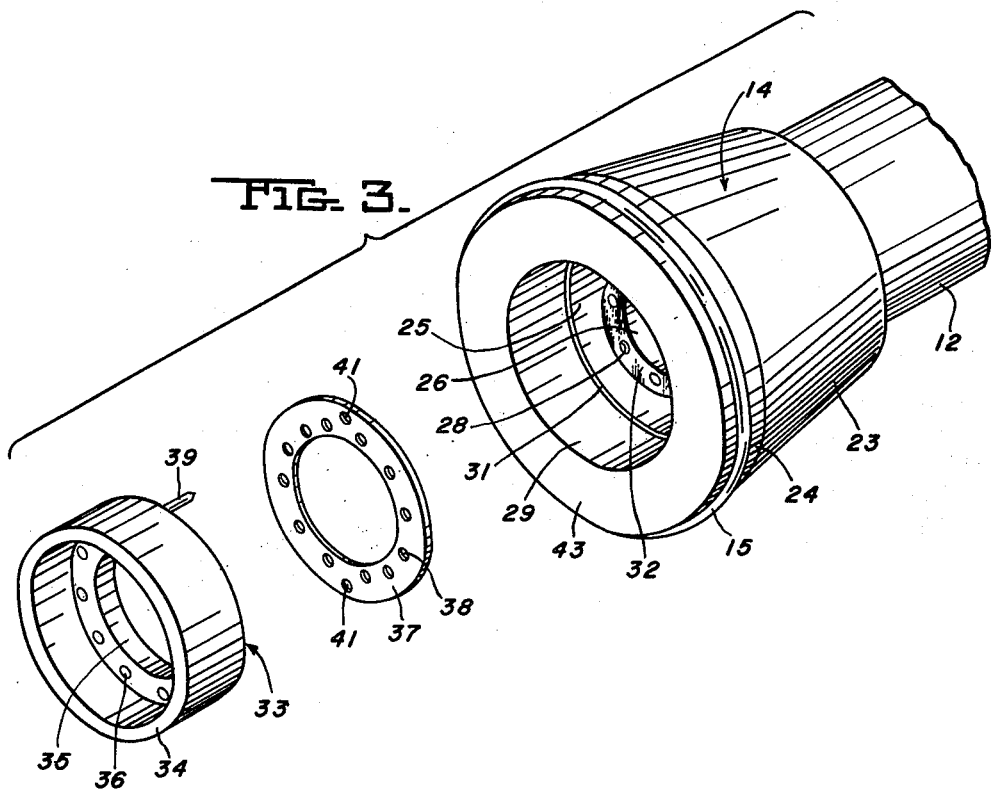
INVENTOR.
DANIEL A. MARRA Sr.
By
Attorneys 3,181,588
SCARFING TORCH TIP
Daniel A. Marra, Sr., P.O. Box 211, Cheswick, Pa.
Filed Apr. 16, 1962, Ser. No. 187,681
4 Claims. (Cl. 158—27.4)

This invention relates generally to scarfing torch tips, and more particularly to a scarfing tip with a heat resistant head at the delivery end of the tip.

Scarfing is the practice in steelmaking of conditioning or removing the surface of steel slabs as they are prepared in primary mills preliminary to their rolling or shaping in secondary mills. The surface blemishes, such as slivers and scabs, must be made smooth by melting of the surface by torches termed scarfers, or by scarfing machines which employ a number of suitably disposed scarfing torches on a framework for a pass of slabs. In the latter instance, the scarfing process is carried out on hot steel between stages of rolling.

Essentially, scarfing torches, either hand or machine, are oxygen torches which are employed to oxidize a metallic surface at an elevated temperature whereat the surface becomes molten. The oxygen is forced onto the surface by the torch at a pressure sufficient to blast the molten metal surface in a smoothing operation and sweep it much like the operation of the hosing of dirt from a surface with water.

To accelerate the rate at which the elevated temperature of melt is reached by the torch, fuel gas is supplied to the torch which, mixed with oxygen, rapidly brings a spot on the steel surface to the melting point. Once this point is reached the oxygen reacts chemically with the metal of the surface and oxidizes the metal in an exothermic process. The heat of the oxidizing reaction maintains the process continuous without the necessity for the fuel gas, and it is consequently shut off by suitable valving arrangements appertinent to the torch fuel supply lines.

Known scarfing torch tips are generally of the same over-all construction because their functioning is alike. Examples of torch tips now utilized by scarfing torches are those disclosed in my patents numbered 2,671,501 of March 9, 1954; 2,655,988 of October 20, 1953; and 2,514,777 of July 11, 1950. In the first-listed patent, my torch tip is shown as having a body with fuel gas apertures passed axially through the walls thereof and surrounding a central axial bore provided for conducting oxygen to the delivery end from a source of supply. A shoe, as as shown best in FIG. 6 of the patent drawing, of sintered metallic carbide material forms a protective flared head for the tip at the delivery end.

The present invention is an improvement of the scarfing torch tip illustrated in my Patent 2,671,501. In practice the patented tip has proved successful both in operation and duration. However, the life of the tip comprising the instant invention is found to be at least five times greater than the scarfing tips known in the art, being more highly resistant to destruction by heat and by impacts with various objects brought about by mishandling.

It is a principal object of this invention to provide a new and improved scarfing tip.

Another object is to provide a scarfing tip comprised of elements which are assembled with precision by guide members forming a part of the tip assemblage.

Still another object is the provision of a scarfing tip having a delivery end which is exposed to the extreme high temperatures of the oxidizing reaction but protected from thermal destruction by a novel heat shield or face.

A further object is to provide a scarfing tip having a member for guarding the material of the heat shield against abusive forces which would damage the surface of the shield.

Another object is to provide a torch tip having a shoe or shield at the delivery end thereof which protectively envelopes other material of the tip which is more sensitive to high temperature and abuse.

A complete understanding of the invention may be had from the following detailed description of a specific embodiment thereof when read in conjunction with the appended drawings, wherein:

FIG. 1 illustrates the oxygen torch tip in side elevation view;

FIG. 2 is an end view of the tip of FIG. 1 and looking into the delivery end of the torch tip; and FIG. 3 is an enlarged exploded view of the delivery end of the torch tip.

Referring now to the drawings, wherein like reference characters designate like or corresponding parts throughout the several views, there is shown in FIG. 1, which illustrates a preferred embodiment, a scarfing tip generally designated numeral 11. The tip 11 is comprised essentially of four major components which are the body 12, a pipe union 13, a heat shield 14, and a tempered steel wearing ring 15.

The body 12 is tubular is configuration and, as is the general practice, is composed of an alloy or metal such as copper, aluminum, brass, or other material which is formable under pressure and easily machined. An annular flange 16 is formed on the tip body 12 at a location whereat the union 13 may bear against it in abutting and sealing relationship when the union is threadedly engaged to the torch tip handle, not shown, which carries the gas supply lines, for example.

The attachment end 17 of the body 12 is tapered for suitable connection to the oxygen and fuel gas supply lines, and inasmuch as this attachment arrangement is well known in the art, it will suffice to say that the fuel gas openings 18 are arranged circumferentially on the taper wall of the end 17. The oxygen supply bore 19 extends axially through the body 12 and is connected at the attachment end 17 to a suitable gas line, not shown. The opening of axial bore 19 at the attachment end 17 is shouldered as at 21.

At the delivery end 22 of the tip 11 the protective shoe or heat shield 14 is shown in FIGS. 1 and 3 to have the configuration of a frustum of a cone, with a tapered portion 23 beginning rearwardly of the wearing ring 15 on a cylindrical tip portion 24, and extending axially for the remainder of its length. The shield 14 is provided with an axial bore 25 of a diameter only slightly larger than the outside diameter of the tubular body 12 at the delivery end 22 of the tip 11, the shoe or shield 14 is consequently slidably received over the delivery end 22 of the tip, and is fixed thereon by suitable means such as brazing.

The wall 26 of the body 12 has a thickness of sufficient dimension such that a series of fuel gas passages 27 are bored axially through the body walls from the fuel gas openings 18 at the attachment end 17 of the tip 11 to the ports 28 at the delivery end 22 of the tip body 12 concentrically about the bore 19, as shown in FIGS. 2 and 3.

A counterbore 29 fashioned in the end of the shield 14 provides an annular step 31 which serves as a stop. The step is aligned in a plane transverse to the longitudinal axis of the tip body with the plane including the terminal face 32 of the wall 26 of the body 12 as shown in FIG. 3.

A cup-shaped liner or annulus 33 of suitable heat resistant or refractory material such as sintered carbide is shown comprised of a cylindrical wall portion 34 of an outer diameter to be telescopically received and fitted into the counterbore 29 to a depth determined by the step 31 against which the liner 33 bottoms. In the assembled position the liner 33 is enveloped by the shield 14. An integral internal flange portion 35 is provided therein, the central area defined by the flange being a port that registers with the central passages 19 through the body and the flange has a series of ports 36 therein which match the pattern of the ports 28 at the terminal of the wall 26.

As shown in FIG. 3, a brazing ring 37 of material such as silver or the like is also provided with a plurality of radially spaced openings 38. The ring 37 is sandwiched between the terminal face of the body wall 26 and the lower surface of the bottom portion 35 of the liner 33, and is utilized to bond by means as brazing, the liner to the terminal face of the wall 26.

To assist in the proper alignment of the passages 36 of lines 33 with the openings 38 of the ring 37 and the gas ports 28 of the body wall 26, a pair of diametrically opposite guide pins 39 are fixed to the liner 33 and extend axially from the bottom thereof. The guide pins 39 are received through guide holes 41 of the ring 37 and similarly located guide apertures 42 in the terminal face of the body wall 26. In this manner the fuel gas passages 36 of the liner register with ports 28 of the body.

The bottom portion 35 of the liner 33 is recessed within the heat shield 14 of the tip for the purpose of providing a mixing zone recessed from the end of the torch and entirely surrounded except at the open end by, and in intimate contact with, the shield 14, the terminal face of the liner 33 being flush with the face 43 when the liner 33 is bottomed against the annular step 31 within the counterbore 29 of the shield 14.

The face 43 of the shield 14 is flared rearwardly at its periphery to form an annular abutment against which the wear ring 15 is biased. The wear ring is force fitted partially into a shouldered step formed in the cylindrical portion 24 of the shield 15; consequently, the ring 15 is seated between the annular terminal of the flared wall portion of the face 43 and the shoulder formed by reducing the diameter of the cylindrical portion 24 of the shield 14.

The material forming the heat shield 14 is preferably a heat-conducting metal such as copper. The face 43 is formed by upsetting or forging the end of a cylinder of ductile material so as to shape a flared annular collar which is extended in axial length to urge the wearing ring 15 into captured position against the face of an annular abutment. The copper shield is relatively massive, its wall thickness being greater than the outer end of the burner end of the liner, and the liner, except for its internal flange, is of large outside diameter than the tubular body. Of course, the wear ring in assembled position on the shield 14 has an outside diameter greater than the outside diameter of the balance of the shield 14 such that blows are received against the ring rather than the soft copper material of the shield. It is important that the outer surface of the heat shield 14 be maintained with a smooth finished surface in order that molten metal will not adhere thereto and reduce the effectiveness of the heat shield. The sheld has two functions. First, being of copper, it conducts the intense heat away from the liner and the torch end. Secondly, it protects the liner from impact, and being of relatively ductile metal, tends to cushion some of the impact. The steel ring 15 of course prevents the ductile metal near the end of the tip from directly contacting any foreign object, and the ring 15 is spaced back from the end of the tip on the copper shield sufficiently far so that it will not be softened by heat or oxidized.

It is manifest that the above-described embodiment of the invention is merely illustrative and that numerous modification may be made within the spirit and scope of the invention. Further, it will be understood that the particular tip body and pipe union utilized in the practice of the invention is only exemplary of the type elements which may be incorporated into the tip assembly, and the invention is not limited to the use of these elements.

What is claimed is:

1. A scarfing torch tip having a burner end and an opposite end, said tip comprising a generally tubular body having a central oxygen passageway extending axially therethrough and having a series of gas passageways extending therethrough in concentric arrangement about the oxygen passageway, a separate shield of a high heat-conducting metal at the burner end of the tubular body having an opening therethrough, the tubular body terminating in said opening and snugly fitting therein, the shield being of larger minimum exterior diameter than the tubular body, said shield having an end free and a shouldered cavity in its end face, a refractory liner in said cavity comprising an annulus closely fitted into said cavity and secured therein, the annulus having an internal flange sealed against the end of the tubular body with a central port aligned with the oxygen passageway of the tubular body and a series of ports in the flange about the central port registering with the fuel passageways in the tubular body, a mixing space for fuel and oxygen being provided in the annulus between said flange and the burner end of the torch tip, the tubular body having a coupling means at said opposite end for connecting it with a torch.

2. A scarfing torch tip as defined in claim 1 in which the refractory annulus is of larger outside diameter than the tubular body and the shield around the refractory annulus has a thicker wall than the burner end of the annulus, the shield being of copper.

3. A scarfing torch tip as defined in claim 1 in which the refractory annulus is of larger outside diameter than the tubular body and the shield around the refractory annulus has a thicker wall than the burner end of the annulus, the shield being of copper, and a steel protecting ring encircling the shield and fitting about the periphery of the shield near the burner end but spaced inwardly from said end, said ring protruding beyond the surface of the shield.

4. A scarfing torch tip as defined in claim 1 wherein the shield is of maximum diameter at the burner end and has a peripheral portion about which is fixed a steel ring spaced inwardly from the end of the shield, the shield being of gradually decreasing diameter toward said opposite end of the tip.

References Cited by the Examiner

UNITED STATES PATENTS

| | | | |
|---|---|---|---|
| 1,729,677 | 10/29 | Miller | 158—27.4 |
| 2,238,360 | 4/41 | Forster | 158—27.4 X |
| 2,476,456 | 7/49 | Schceller | 158—27.4 |
| 2,483,467 | 10/49 | Jones | 158—27.4 |
| 2,514,777 | 7/50 | Marra | 158—27.4 |
| 2,617,501 | 3/54 | Marra | 158—27.4 |

JAMES W. WESTHAVER, *Primary Examiner.*

FREDERICK L. MATTESON, JR., *Examiner.*